United States Patent [19]

Teraguchi et al.

[11] Patent Number: 6,100,958
[45] Date of Patent: Aug. 8, 2000

[54] METHOD OF MANUFACTURING LIQUID CRYSTAL ELEMENT COMPRISING MAINTAINING PRESSURE BY CONTROLLING VACUUM IN THE CELL GAP DURING HARDENING OF SEALANT

[75] Inventors: Noboru Teraguchi; Ryuji Miyazaki; Yoshihiro Shimizu, all of Nara, Japan

[73] Assignee: Sharp Kabushiki Kaisha, Osaka, Japan

[21] Appl. No.: 09/080,617

[22] Filed: May 18, 1998

Related U.S. Application Data

[63] Continuation-in-part of application No. 08/734,859, Oct. 23, 1996, abandoned.

[30] Foreign Application Priority Data

Nov. 9, 1995 [JP] Japan ..................................... 7-290729

[51] Int. Cl.⁷ ............................. G02F 1/13; G02F 1/1339
[52] U.S. Cl. ......................... 349/187; 349/153; 349/190
[58] Field of Search .................................. 349/190, 187, 349/153

[56] References Cited

U.S. PATENT DOCUMENTS

| | | | |
|---|---|---|---|
| 4,283,119 | 8/1981 | Hofmann | 349/153 |
| 4,297,401 | 10/1981 | Chern et al. | 349/153 |
| 4,923,552 | 5/1990 | Fukushima et al. | 156/273.9 |
| 5,361,152 | 11/1994 | Harada et al. | 349/188 |
| 5,455,696 | 10/1995 | Saito et al. | 359/80 |
| 5,499,127 | 3/1996 | Tsubota et al. | 349/153 |
| 5,515,188 | 5/1996 | Miles et al. | 359/62 |
| 5,568,297 | 10/1996 | Tsubota et al. | 349/153 |
| 5,677,749 | 10/1997 | Tsubota et al. | 349/160 |
| 5,742,372 | 4/1998 | Furukawa | 349/187 |

FOREIGN PATENT DOCUMENTS

| | | |
|---|---|---|
| 01056414 | 3/1989 | Japan. |
| 01296219 | 11/1989 | Japan. |
| 4-291320 | 10/1992 | Japan. |
| 4-324823 | 11/1992 | Japan. |
| 6-175097 | 6/1994 | Japan. |

*Primary Examiner*—Kenneth Parker
*Attorney, Agent, or Firm*—Dike, Bronstein, Roberts & Cushman, LLP; George W. Neuner; David G. Conlin

[57] ABSTRACT

A pair of electrode substrates are combined with a sealing material and spacers therebetween. A cell gap of a liquid crystal display element is controlled by maintaining the pressure in the space between the pair of electrode substrates at a predetermined pressure for a period of time as part of an evacuation process for the pair of electrode substrates, and pressing the pair of electrode substrates with atmospheric pressure. This prevents a sealing edge from becoming irregular due to bubbling of the sealing material, thereby providing the liquid crystal display element thus obtained with good linearity in the sealing edge. Moreover, since movement of the spacers near an exhaust port is prevented, irregular display coloring is eliminated, which enables the liquid crystal display element to have good display characteristics. Furthermore, since the sealing edge does not become irregular, the liquid crystal display element has excellent uniformity in the cell gap.

17 Claims, 6 Drawing Sheets

METHOD OF MANUFACTURING LIQUID CRYSTAL ELEMENT COMPRISING MAINTAINING PRESSURE BY CONTROLLING VACUUM IN THE CELL GAP DURING HARDENING OF SEALANT

This application is a C-I-P of Ser. No. 08/734,859 filed Oct. 23, 1996 abandoned.

FIELD OF THE INVENTION

The present invention relates to a method of manufacturing liquid crystal display element, and more particularly to such a manufacturing method including a process of combining a pair of electrode substrates, in which a space between the electrode substrates is evacuated for depressurization thereof so that the electrode substrates are pressed to each other.

BACKGROUND OF THE INVENTION

Conventionally, when a liquid crystal display element is manufactured, a cell gap in the liquid crystal display element (thickness of a liquid crystal layer) has been controlled by carrying out the following process after combining a pair of electrode substrates. A pair of electrode substrates are first combined, using a spacer and a thermosetting type sealing material as a sealing material therebetween, and then a plurality of combined pairs of electrode substrates are stacked. The electrode substrates are pressed with a pressing machine and heated at the same time.

However, since the electrode substrates are mechanically pressed by the pressing machine, the following problems inevitably occur with the method: It is difficult to uniformly press the whole electrode substrates even if upper and lower pressing plates provided to the pressing machine are highly parallel and have a smooth surface, and the combined electrode substrates have smooth surfaces. In addition, since a plurality of pairs of electrode substrates are stacked when pressed, if one of the pairs is irregularly pressed, the irregularity in pressing accumulates, possibly affecting the uniformity of the cell gap. Moreover, if there is a foreign substance on the electrode substrate, an extra heavy load is created locally, which makes irregular display coloring more likely to happen.

Japanese Laid-Open Patent Application No. 4-291320/1992 (Tokukaihei 4-291320) and Japanese Laid-Open Patent Application No. 6-175097/1994 (Tokukaihei 6-175097) are disclosure examples regarding methods to solve these problems of irregularity in pressing, affection from a foreign substance, etc.

Japanese Laid-Open Patent Application No. 4-291320/1992 (Tokukaihei 4-291320) discloses a method of putting a combined pair of electrode substrates in a wrapping bag and evacuating the air in the wrapping bag for depressurization thereof. In other words, the method creates a closed space containing the electrode substrates and utilizes a difference between atmospheric pressure and a pressure in the wrapping bag for pressing. According to this conventional method, after the air in the wrapping bag is evacuated for depressurization thereof, an exhaust port is closed, and then a thermosetting type sealing material is cured by heating. The pressure is specified to 20 to 1.2 Torr after evacuation to prevent the sealing material to bubble and sealing edge to become irregular.

Meanwhile, Japanese Laid-Open Patent Application No. 6-175097/1994 (Tokukaihei 6-175097), similarly to the above disclosure example, discloses a method of evacuating a space between a combined pair of electrode substrates in a closed space for depressurization thereof and thereby utilizing a difference between atmospheric pressure and an internal pressure for pressing.

According to this method, the whole electrode substrates are uniformly pressed. Besides, since the electrode substrates and a sealing material are adhered under vacuum atmosphere, the air is prevented from remaining on adhesion surfaces of the electrode substrates and the sealing material.

However, according to the method disclosed in Japanese Laid-Open Patent Application No. 4-291320/1992 (Tokukaihei 4-291320), the pressing utilizing the difference between atmospheric pressure and the pressure in the wrapping bag and the curing of the sealing material with heat are conducted separately. As a result, this method entails difficulty in forming a good sealing portion, i.e., difficulty in preventing the sealing edge to become irregular. Moreover, a foreign substance in the wrapping bag results in an irregular pressing, which in turn causes the irregular display coloring to be more likely to happen.

Furthermore, according to the method disclosed in Japanese Laid-Open Patent Application No. 6-175097/1994 (Tokukaihei 6-175097), the air in a portion composing the liquid crystal display element between the pair of electrode substrates is evacuated only through an exhaust port portion of the liquid crystal display element. Therefore, at an early stage of the evacuation, since there occurs a great difference in pressure between a portion composing the liquid crystal display element and a portion not composing the liquid crystal display element between the electrode substrates, the sealing material itself bubbles and the sealing edge is more likely to become irregular. In addition, at an early stage of the evacuation, since the air flows fast near the exhaust port portion, the spacer in the portion composing the liquid crystal display element moves easily and thus makes the irregular display coloring more likely to occur.

SUMMARY OF THE INVENTION

It is an object of the present invention to provide a method of manufacturing a liquid crystal display element, which produces a liquid crystal display element having a good sealing portion, no irregular display coloring caused by movement of spacers near an exhaust port, and excellent uniformity in a cell gap.

In order to accomplish the object, the method of manufacturing a liquid crystal display element in accordance with the present invention is characterized in that it includes the steps of:

(1) sealing a pair of electrode substrates with a sealing material and spacers therebetween;

(2) controlling a cell gap by evacuating a space between the pair of electrode substrates and by pressing the pair of electrode substrates with atmospheric pressure; and (3) setting the sealing material, wherein the step (2) includes at least the step of maintaining the pressure in the space between the pair of electrode substrates at a predetermined pressure, and the steps (2) and (3) are conducted simultaneously.

With the arrangement, the pair of electrode substrates are combined with the sealing material and the spacers therebetween. The cell gap of the liquid crystal display element is controlled by gradually evacuating the space between the combined electrode substrates and thereby pressing the electrode substrates with atmospheric pressure.

With the arrangement, since the pressure in the space between the pair of electrode substrates is maintained at a predetermined pressure as part of the evacuation process of the pair of electrode substrates, the difference in pressure between a portion composing the liquid crystal display element and a portion not composing the liquid crystal display element between the electrode substrates is surely made smaller than that in the conventional method. Therefore, the sealing material does not bubble. Moreover, the air flows slower near the exhaust port than in the conventional method of evacuating the space at one time, thereby restraining the movement of the spacers near the exhaust port.

Therefore, the arrangement prevents the sealing edge from becoming irregular due to the bubbling of the sealing material, thereby allowing the liquid crystal display element to have good linearity in the sealing edge. Moreover, since the movement of the spacers is restrained near the exhaust port, the irregular display coloring is eliminated. Consequently, the liquid crystal display element thus obtained has good display characteristics. Also, since the evacuation treatment of the space between the pair of electrode substrates is conducted simultaneously with the setting treatment of the sealing material, the liquid crystal display element is manufactured with high productivity.

Here let's take an example where the evacuation treatment is conducted before the setting treatment of the sealing material, as a case where the evacuation treatment and the setting treatment are conducted separately. In such an example, since the evacuation treatment is suspended when the sealing material is yet to cure, when the pressure inside the cell returns to atmospheric pressure, the pressure between the substrates subsides and the cell gap widens. Therefore, the cell gap cannot be controlled satisfactorily with such a method.

In a case where the sealing material and the substrates are composed of, for example, a thermosetting resin and glass respectively, the glass substrates expand with heating and shrink with cooling as a result of curing and cooling of the sealing material, which affects the cell gap. The glass substrates are distorted as a result of the expansion with heating and shrinkage with cooling until the cell gap reaches its final value. Especially, if the evacuation treatment and the setting treatment of the sealing material are conducted separately, the phenomenon becomes more evident, causing partial irregularity in the cell gap to be more likely to occur in the panel.

By contrast, although the arrangement does not totally prevent the substrates from expanding and shrinking with heat, it minimizes the negative effects from the expansion and shrinkage by simultaneously conducting the evacuation treatment and the setting treatment. The arrangement thereby forms a cell gap in a very stable environment while maintaining the cell gap almost at a constant value. In other words, the arrangement can form a uniform cell gap in the panel.

Besides, more preferably, the method of manufacturing a liquid crystal display element in accordance with the present invention so arranged that the sealing material is a thermosetting type material, the sealing material is heated at the same time with the evacuation, and the pressure between the electrode substrates reaches a final target value before the sealing material reaches the thermosetting temperature thereof. The arrangement produces following effects:

For example, a thermosetting resin is soft at temperatures below the thermosetting temperature thereof and sets when heated up to the thermosetting temperature. If the sealing material sets before the pressure between the electrode substrates reaches the final target value, the pressing is not properly conducted, thereby affecting the uniformity in the cell gap.

Therefore, if the evacuation for depressurization between the electrode substrates and the heating are conducted at the same time, and if the sealing material is enough softened when the pressure between the electrode substrates reaches the final target value, the pressing is properly conducted. Therefore, with the arrangement, since the pressure between the electrode substrates reaches the final target value before the sealing material reaches the thermosetting temperature thereof, the pressing is properly conducted when the sealing material is enough softened. Consequently, the liquid crystal display element thus obtained has excellent uniformity in the cell gap.

For a fuller understanding of the nature and advantages of the invention, reference should be made to the ensuing detailed description taken in conjunction with the accompanying drawings.

DESCRIPTION OF THE EMBODIMENTS

Embodiment 1

Referring to FIGS. 1 through 4, the following description will discuss an embodiment in accordance with the present invention.

Figure 1:
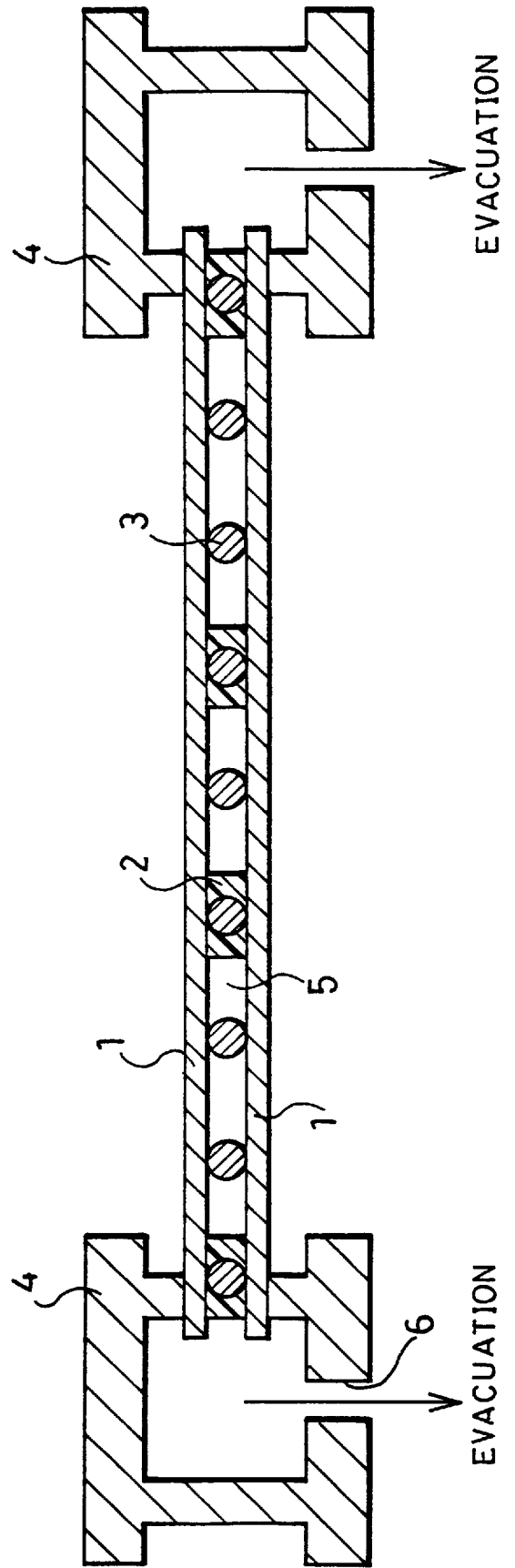
FIG. 1 is a simplified cross-sectional view showing a structure of a liquid crystal display element manufactured with a method of manufacturing a liquid crystal display element in accordance with the present invention.

FIG. 1 is a simplified cross-sectional view showing a structure of a liquid crystal display element manufactured with a method of manufacturing a liquid crystal display element in accordance with the present invention. The liquid crystal display element includes a pair of electrode substrates 1 composed of glass or plastic, a thermosetting type sealing material 2 composed of, for example, an epoxy resin, and spacers 3 composed of, for example, plastic beads. The sealing material 2 and the spacers 3 are sandwiched between the electrode substrates 1. The following description will discuss a method of manufacturing a liquid crystal display element having such a structure.

First, transparent electrodes composed of, for instance, indium tin oxide (ITO) are provided on the electrode substrates 1 with photo process so as to form a predetermined pattern. Next, an orientation film (not shown) of, for instance, a polyimide resin is provided on the electrode substrates 1. The orientation film then receives orientation treatment with printing, rubbing and the like. Next, the electrode substrates 1 are combined, using the spacers 3 and the thermosetting type sealing material 2 which sets at 160° C. therebetween. The pattern of the sealing material 2 is formed with, for example, printing. The spacers 3 are mixed with the sealing material 2 at a weight ratio to the sealing material 2 of 8%.

Note that the present invention does not have any restriction on material and methods employed therein: i.e., the material of the electrode substrates 1, the material and pattern forming method of the transparent electrodes, the material, forming method and orientation treatment method of the orientation film, the material for the sealing material 2, the sealing pattern forming method thereof and the material for the spacers 3.

Next, the combined electrode substrates 1 are pinched at fringe portions thereof with clamp tools 4. A space 5 between the electrode substrates 1 is evacuated according to a profile shown in FIG. 2 so that the space 5 is depressurized to pressure 1 (P1) of, for instance, 500 Torr. The space 5 is evacuated for depressurization thereof through an exhaust port 6 provided to the clamp tool 4. In the following description, the time when the pressure in the space 5 reaches pressure Pi will be referred to as the reference time.

Note that the present invention does not have any restriction on material and shape of the clamp tools 4 employed therein. Besides, the reference time is not necessarily the time when the pressure in the space 5 reaches 500 Torr. The reference time only needs to be determined to be the time when the pressure in the space 5 is the most suitable for obtaining a liquid crystal display element having a good sealing portion, no irregular display coloring caused by movement of the spacers 3 near the exhaust port 6, and excellent uniformity in a cell gap.

In the present embodiment, the pressing of the electrode substrates 1 and the heating of the sealing material 2 are conducted at the same time with methods illustrated in examples 1 through 3.

Example 1

Figure 3:
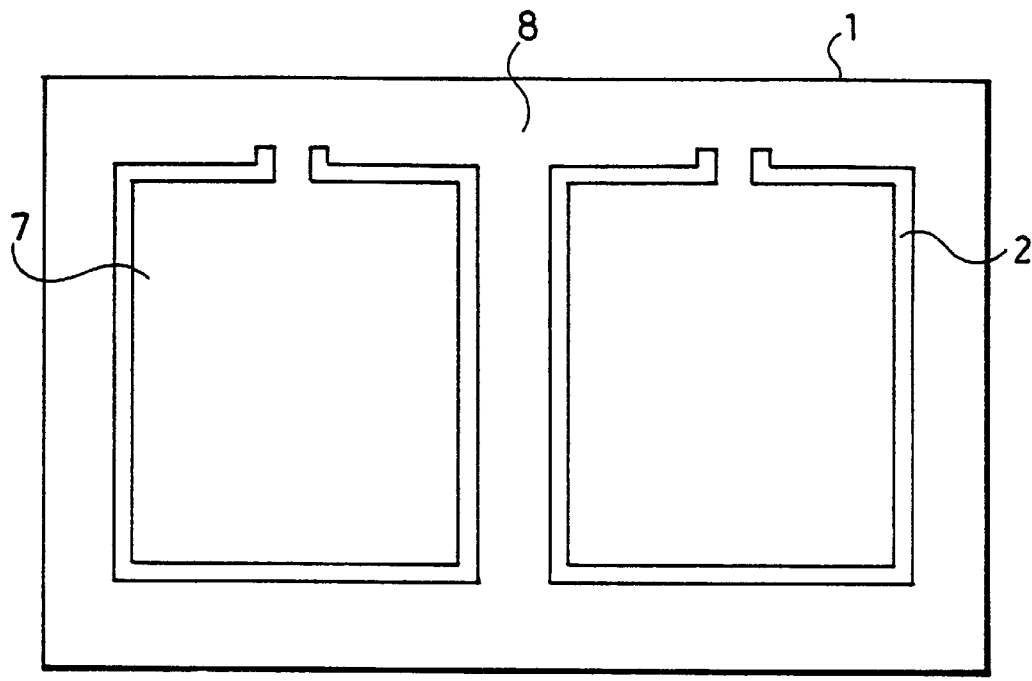
FIG. 3 is a plan view of the electrode substrate.

In the present example, pressure P1 is sustained for 20 minutes from the reference time to Time 1 (T1) so that a portion 7 composing the liquid crystal display element and a portion 8 not composing the liquid crystal display element between the electrode substrates 1 shown in FIG. 3 have almost the same pressure. Thereafter, the space 5 is evacuated, for example, at a speed of 100 mm$^3$/minute for 10 minutes from T1 to Time 2 (T2), so that the pressure therein is reduced to pressure 2 (P2) of 200 Torr. Pressure P2 is then maintained for 25 minutes from T2 to Time 4 (T4) to complete the evacuation for depressurization, or in other words, to complete the pressing.

Figure 2:
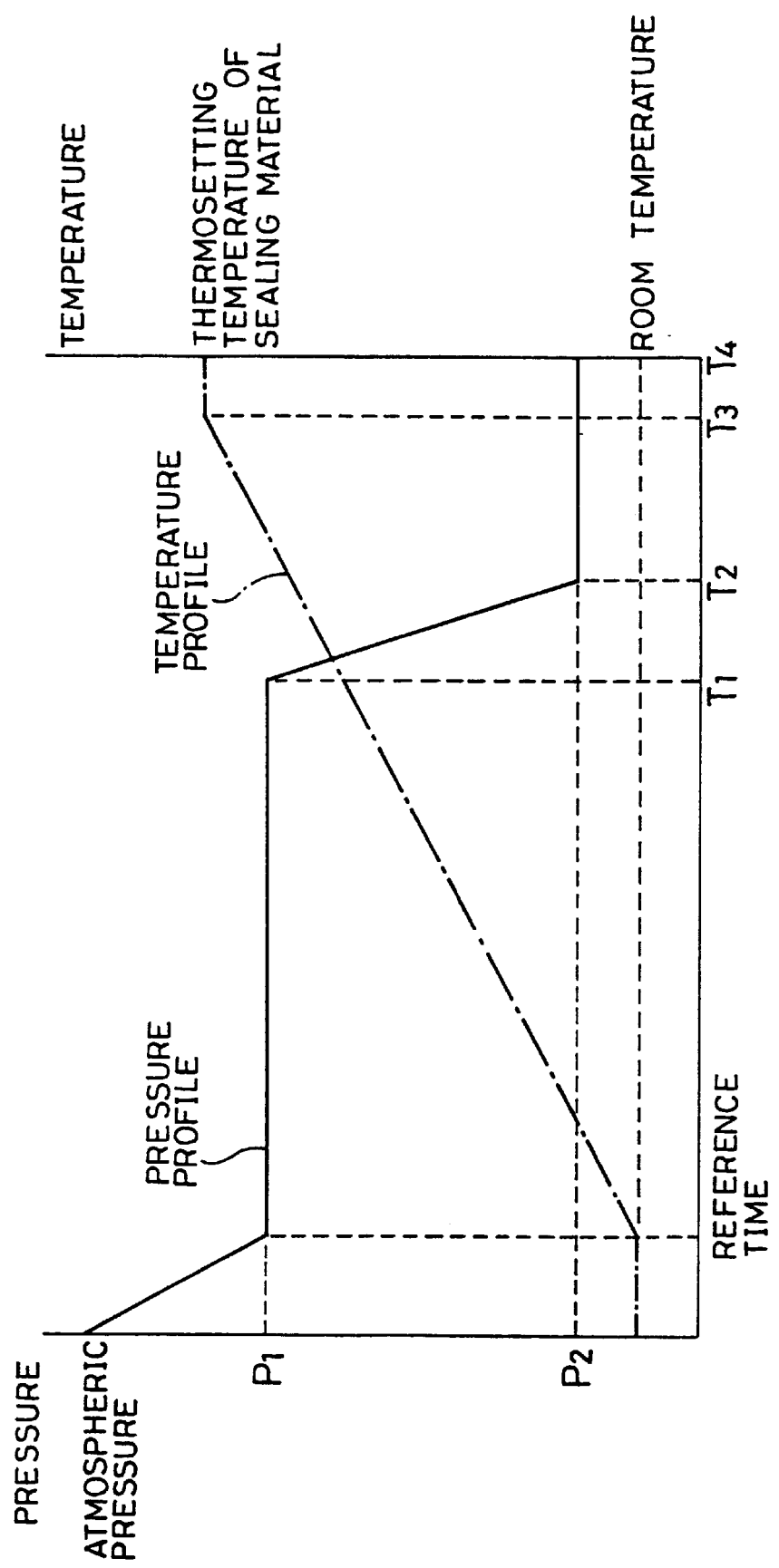
FIG. 2 is a graph illustrating an embodiment in accordance with the present invention in which the pressure between a pair of electrode substrates is controlled in a gradual, stepped manner while heating is being conducted continuously, and more particularly showing correlation between pressure changes in a space between the pair of electrode substrates and temperature changes of a sealing material with the final target value of the pressure being lower than a predetermined pressure at which the electrode substrates are maintained for a period of time.

Meanwhile, in synchronization with the pressing, the thermosetting type sealing material 2 is cured by heating according to a profile shown in FIG. 2. Specifically, the sealing material 2 is heated up to 160° C., the thermosetting temperature of the sealing material 2, in the 40 minutes between the reference time and Time 3 (T3). In this case, since the pressure reaches pressure P2 before the temperature of the sealing material 2 reaches the thermosetting temperature thereof, a good pressing is performed. Thereafter, the thermosetting temperature is maintained for 15 minutes from T3 to T4 to complete the heating.

Note that the pressure in the space 5 is not necessarily reduced to 200 Torr as in the present example. The pressure only needs to be determined to be the most suitable for obtaining a liquid crystal display element having a good sealing portion, no irregular display coloring caused by movement of the spacers 3 near the exhaust port 6, and excellent uniformity in a cell gap.

Next, after-baking is conducted for 90 minutes at 170° C., and then the electrode substrates 1 are cut into a predetermined shape. Thereafter, a liquid crystal material is injected between the electrode substrates 1 to obtain the liquid crystal display element. Table 1 shows judged results on the state of the sealing portion and on the non-movement characteristic of the spacers 3, and an overall rating with respect of the liquid crystal display element obtained in this manner.

Example 2

In the present example, pressure P1 of, for example, 500 Torr is maintained for 20 minutes from the reference time to T1. Thereafter, the space 5 is evacuated, for example, at a speed of 50 mm$^3$/minute for 20 minutes from T1 to T2, so that the pressure therein is reduced to pressure P2 of 200 Torr. Pressure P2 is then maintained for 15 minutes from T2 to T4 to complete the evacuation for depressurization, or in other words, to complete the pressing.

Meanwhile, in synchronization with the pressing, the thermosetting type sealing material 2 is cured by heating according to a profile shown in FIG. 2. Specifically, the sealing material 2 is heated up to 160° C., the thermosetting temperature of the sealing material 2, in the 40 minutes between the reference time and T3. In this case, since the pressure reaches pressure P2 before the temperature of the sealing material 2 reaches the thermosetting temperature thereof, a good pressing is performed. Next, the thermosetting temperature is maintained for 15 minutes from T3 to T4 to complete the heating. Thereafter, the same processes for example 1 are conducted to obtain the liquid crystal display element. Table 1 shows judged results on the state of the sealing portion and on the non-movement characteristic of the spacers 3, and an overall rating with respect of the liquid crystal display element obtained in this manner.

Example 3

In the present example, pressure Pi of, for example, 500 Torr is maintained for 20 minutes from the reference time to T1. Thereafter, the space 5 is evacuated, for example, at a speed of 200 mm³/minute for 5 minutes from T1 to T2, so that the pressure therein is reduced to pressure P2 of 200 Torr. Pressure P2 is then maintained for 30 minutes from T2 to T4 to complete the evacuation for depressurization, or in other words, to complete the pressing.

Meanwhile, in synchronization with the pressing, the thermosetting type sealing material 2 is cured by heating according to a profile shown in FIG. 2. Specifically, the sealing material 2 is heated up to 160° C., the thermosetting temperature of the sealing material 2, in the 40 minutes between the reference time and T3. In this case, since the pressure reaches pressure P2 before the temperature of the sealing material 2 reaches the thermosetting temperature thereof, a good pressing is performed. Next, the thermosetting temperature is maintained for 15 minutes from T3 to T4 to complete the heating. Thereafter, the same processes for example 1 are conducted to obtain the liquid crystal display element. Table 1 shows judged results on the state of the sealing portion and on the non-movement characteristic of the spacers 3, and an overall rating with respect of the liquid crystal display element obtained in this manner.

Note that although in the present embodiment the pressure is reduced in two stages as illustrated by the pressure profile in FIG. 2, the pressure may be reduced in three or more stages.

In addition, it is preferable to maintain pressure P2 until the temperature returns to room temperature.

Embodiment 2

Referring to examples 4 through 6 and FIGS. 1 through 4, the following description will discuss another embodiment in accordance with the present invention. Here, for convenience, members of embodiment 2 that have the same arrangement and function as members of embodiment 1, and that are mentioned in embodiment 1 are indicated by the same reference numerals and description thereof is omitted.

Example 4

In the present example, the spacers 3 are mixed with the sealing material 2 at a weight ratio to the sealing material 2 of 10%, which is the only difference between the present example and example 1. Table 2 shows the mixture ratio of the spacers 3 to the sealing material 2, judged results on the

TABLE 1

|  | EVACUATION SPEED | STATE OF SEALING PORTION | NON-MOVEMENT CHARACTERISTIC OF SPACERS 3 | OVERALL RATING |
|---|---|---|---|---|
| EXAMPLE 1 | 100 mm³/minute | Very Good | Very Good | Very Good |
| EXAMPLE 2 | 50 mm³/minute | Very Good | Very Good | Very Good |
| EXAMPLE 3 | 200 mm³/minute | Good | Good | Good |

Table 1 shows that if the evacuation speed is 50 to 200 mm³/minute, the state of the sealing portion and non-movement characteristic of the spacers 3 are either very good or good. This is presumably because the sealing material 2 does not bubble and the sealing edge is not irregular. In addition, in the above methods, the gradual evacuation of the space 5 presumably restrains the movement of the spacers 3 near the exhaust port 6.

Figure 4:
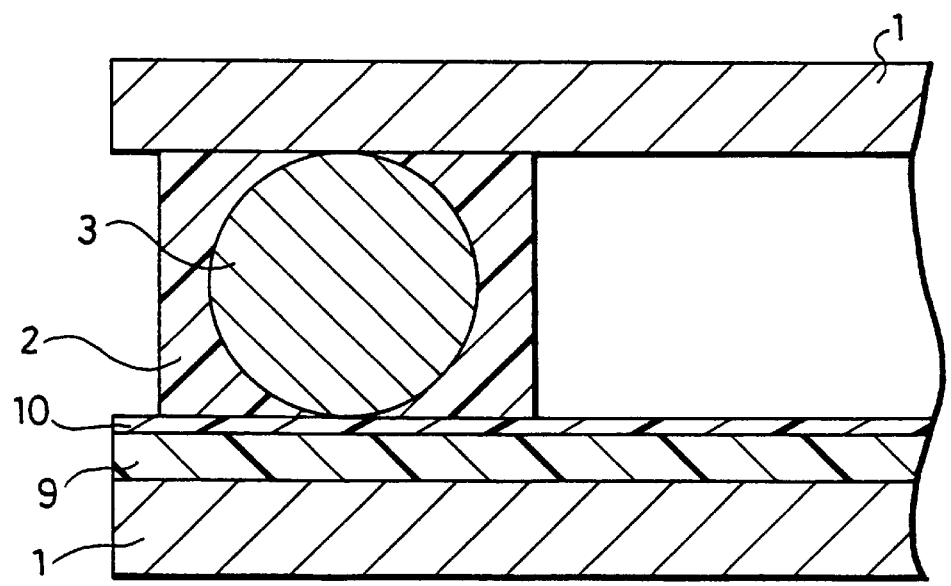
FIG. 4 is a cross-sectional view showing a spacer sinking into an overcoating film.

Therefore, according to the above methods, since the sealing edge does not become irregular due to bubbling of the sealing material 2, the liquid crystal display element has good linearity in the sealing edge. Moreover, since the movement of the spacers 3 is restrained near the exhaust port 6, no irregular display coloring is caused by the movement of the spacers 3. Consequently, the liquid crystal display element has good display characteristics. Furthermore, as shown in FIG. 4, since the spacers 3 sink little into an overcoating film 10 on a color filter 9, the liquid crystal display element has good uniformity in the cell gap.

Table 1 also shows that the state of the sealing portion and non-movement characteristic of the spacers 3 are very good, especially if the evacuation speed is 50 to 100 mm³/minute. Therefore, the evacuation speed is preferably 50 to 100 mm³/minute.

On the contrary, as shown in Table 1, if the evacuation speed is slower than 50 mm³/minute, the overall rating is excellent. However, this is only possible with a time-consuming process at a sacrifice of productivity. Therefore, the evacuation speed is preferably faster than 50 mm³/minute.

state of sinking of the spacers 3 into the overcoating film 10 and on the non-peeling characteristic of the sealing portion 2, and an overall rating with respect of the liquid crystal display element obtained in this manner.

Example 5

In the present example, the spacers 3 are mixed with the sealing material 2 at a weight ratio to the sealing material 2 of 4%, which is the only difference between the present example and example 1. Table 2 shows the mixture ratio of the spacers 3 to the sealing material 2, judged results on the state of sinking of the spacers 3 into the overcoating film 10 and on the non-peeling characteristic of the sealing portion 2, and an overall rating with respect of the liquid crystal display element obtained in this manner.

Example 6

In the present example, the spacers 3 are mixed with the sealing material 2 at a weight ratio to the sealing material 2 of 15%, which is the only difference between the present example and example 1. Table 2 shows the mixture ratio of the spacers 3 to the sealing material 2, judged results on the state of sinking of the spacers 3 into the overcoating film 10 and on the non-peeling characteristic of the sealing portion 2, and an overall rating with respect of the liquid crystal display element obtained in this manner.

TABLE 2

|  | MIXTURE RATIO OF SPACERS 3 TO SEALING MATERIAL 2 | STATE OF SINKING OF SPACERS 3 INTO OVERCOATING FILM 10 | NON-PEELING CHARACTERISTIC OF SEALING MATERIAL 2 | OVERALL RATING |
|---|---|---|---|---|
| EXAMPLE 1 | 8% | Very Good | Very Good | Very Good |
| EXAMPLE 4 | 10% | Very Good | Very Good | Very Good |
| EXAMPLE 5 | 4% | Good | Very Good | Good |
| EXAMPLE 6 | 15% | Very good | Not good | Good |

Table 2 shows that the spacers 3 in example 5 (mixture ratio, 4%) sink a little more into the overcoating film 10 on the color filter 9 than those in example 1 (mixture ratio, 8%). This is because a load supported by each of the spacers 3 is heavier. However, the non-peeling characteristic of the sealing material 2 is very good. Therefore, it is concluded that example 5 produces better uniformity in the cell gap than the conventional method.

Meanwhile, if the mixture ratio of the spacers 3 to the sealing material 2 is 15%, the sealing material 2 might possibly peel off from the electrode substrates 1 with a shock force produced when, for example, the electrode substrates 1 are cut. This is because the mixture ratio of the spacers 3 is too high. The high mixture ratio reduces the adhesion area between the sealing material 2 and the electrode substrates 1, thereby causing the adhesion to weaken. However, Table 2 also shows that in this case also, the spacers 3 sink less into the overcoating film 10 on the color filter 9, producing good uniformity in the cell gap.

If the mixture ratio of the spacers 3 to the sealing material 2 is 8 to 10%, a load supported by each of the spacers 3 becomes optimum for the pressing. As a result, the spacers 3 sink little into the overcoating film 10 on the color filter 9. Besides, the sealing material 2 does not easily peel off.

Therefore, as shown by the overall ratings in FIG. 2, if the mixture ratio of the spacers 3 to the sealing material 2 is 4 to 10%, the spacers 3 sink less into the overcoating film 10 on the color filter 9, thereby improving the uniformity in the cell gap near the sealing portion. More preferably, if the mixture ratio is 8 to 10%, it is ensured that the spacers 3 sink less into the overcoating film 10 on the color filter 9, thereby further improving the uniformity in the cell gap near the sealing portion.

Embodiment 3

Figure 5:
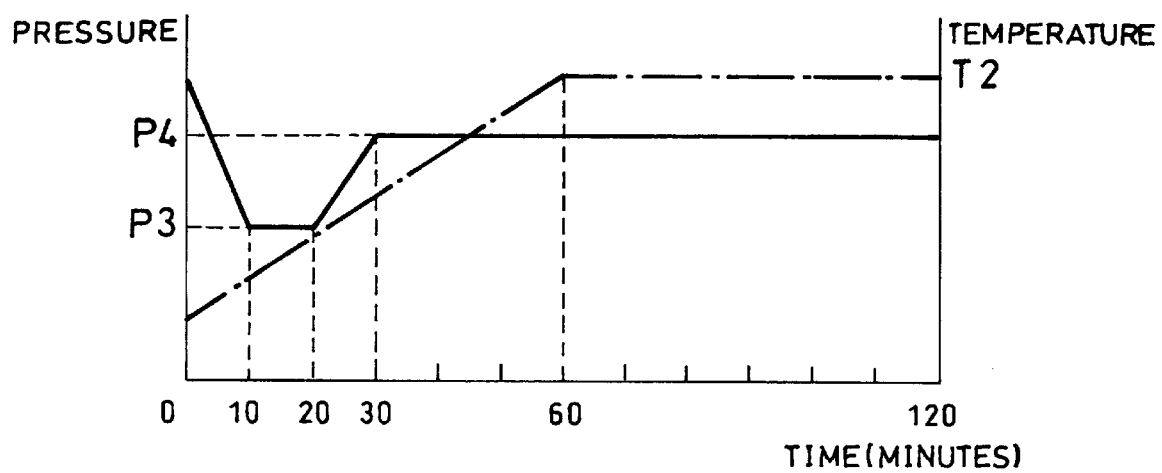
FIG. 5 is a graph illustrating another embodiment in accordance with the present invention in which the pressure between a pair of electrode substrates is controlled in a gradual, stepped manner while heating is being conducted continuously, and more particularly showing correlation between pressure changes in a space between a pair of electrode substrates and temperature changes of a sealing material with the final target value of the pressure being higher than a predetermined pressure at which the electrode substrates are maintained for a period of time.

Referring to FIG. 5, the following description will discuss another embodiment in accordance with the present invention. Here, for convenience, members of embodiment 3 that have the same arrangement and function as members of embodiments 1 and 2, and that are mentioned in embodiments 1 and 2 are indicated by the same reference numerals and description thereof is omitted. Another manufacturing method of a liquid crystal display element will be explained as example 7 in embodiment 3.

Example 7

FIG. 5 shows heating and pressurization profile in a sealing process for electrode substrates 1 of the present example, with the solid line denoting pressurization profile and the alternate long and short dash line denoting heating profile. The pressure shown in FIG. 5 is the pressure between the electrode substrates 1 in atmospheric pressure; the smaller the value, the greater the pressure on the space therebetween. This is also always the case with the drawings for the other examples. The sealing material 2 used in the present example, having viscosity that increases at temperatures slightly exceeding 100° C., starts curing at those temperatures and cures completely at 150° C.

According to the heating profile shown in FIG. 5, the electrode substrates 1 and the sealing material 2 are heated continuously so that the temperature of the sealing material 2 reaches curing completion temperature (hereinafter will be referred to as thermosetting temperature) T2 in 60 minutes from room temperature, and then the electrode substrates 1 are maintained at thermosetting temperature T2 for 60 minutes. According to the pressurization profile shown in FIG. 5, the following procedures are started in synchronization with the heating profile.

First, the electrode substrates 1 are pressurized by continuously evacuating the space between the electrode substrates 1 so that the pressure therein changes from atmospheric pressure to 450 Torr, that is pressure P3. It is specified in the present example that pressure P3 is reached in 10 minutes, starting at atmospheric pressure.

Next, the electrode substrates 1 are maintained at pressure P3 for a predetermined period of time. It is specified in the present example that the electrode substrates 1 are maintained at pressure P3 for 10 minutes. Then evacuation is abated so that the pressure between the pair of electrode substrates 1 changes from pressure P3 to 600 Torr, that is pressure P4. It is specified in the present example that pressure P4 is reached in 10 minutes, starting at pressure P3. In other words, an arrangement is made so that the pressure between the electrode substrates 1 reaches pressure P4 before the temperature of the sealing material 2 reaches thermosetting temperature T2. The electrode substrates 1 are then maintained at pressure P4 for a predetermined period of time to complete the pressurization profile. It is specified in the present example that the electrode substrates 1 are maintained at pressure P4 for 90 minutes to synchronize with the heating profile.

Thereafter, the sealed electrode substrates 1 are subjected to after-bake treatment, liquid crystal material is injected between the electrode substrates 1, and peripheral circuits and a backlight are connected to complete the fabrication of a liquid crystal display element.

In the present example, since the space between the electrode substrates 1 is evacuated in a gradual, stepped manner in synchronization with the heating of the electrode substrate 1 as detailed above, the same effects as in the embodiments 1 and 2 can be achieved.

A larger pressurization force exerted onto the electrode substrates 1 can control the gap more uniformly. However, if the pressure between the electrode substrates 1 are made too small to increase the pressurization force, the electrode substrates 1 and spacers 3 provided between the electrode substrates 1 are distorted.

In the present example, unlike in embodiments 1 and 2, the pressurization force on the electrode substrates 1 is abated before the temperature of the sealing material 2 reaches thermosetting temperature T2. In other words, in a case where the space between the electrode substrates 1 is maintained at pressure P3 for a period of time after evacuation, and then evacuation is continued until the pressure between the electrode substrates 1 reaches the final target value of pressure P4, the final target value is specified to a higher value than predetermined pressure P3. This produces, in addition to the above-mentioned effects, another effect of surely preventing distortion of the electrode substrates 1 and the spacers 3. Also, the abatement of the pressurization force on the electrode substrates 1 can surely prevent inconvenience of the spacers 3 sinking into an overcoating film 10 (see FIG. 4) provided to the electrode substrate 1, and an effect is produced of fabricating a more uniform cell gap. If these effects should surely be achieved, the pressure between the electrode substrates 1 is preferably specified in a range not less than 450 Torr and not more than 600 Torr.

Embodiment 4

Referring to FIGS. 6 to 9, the following description will discuss another embodiment in accordance with the present invention. Here, for convenience, members of embodiment 4 that have the same arrangement and function as members of embodiments 1 to 3, and that are mentioned in embodiments 1 to 3 are indicated by the same reference numerals and description thereof is omitted.

The substrates are heated in the embodiments 1 to 3 to set the sealing material 2 by blowing hot air via a jet nozzle provided inside a chamber and circulating the hot air flow. The jet nozzle is typically disposed on an inner surface of the chamber opposite to one of the side surfaces of the substrates so that the hot air flow can circulate along the longitudinal direction of the substrates placed in the chamber.

Figure 6:
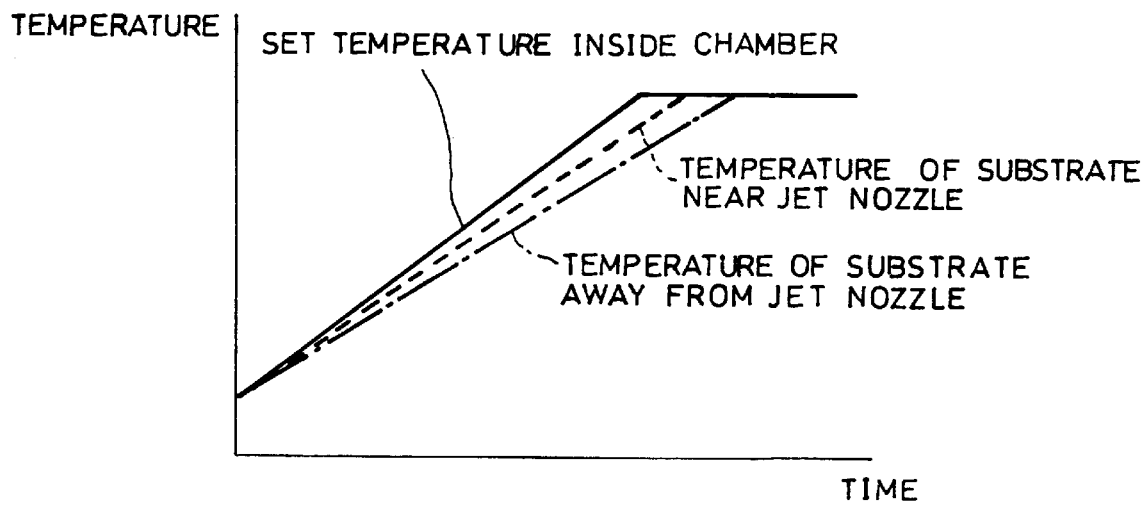
FIG. 6 is a graph showing the difference between temperature changes of an electrode substrate placed in a chamber near, and away from, a jet nozzle via which hot air is blown.

FIG. 6 shows how an electrode substrate placed in a chamber is heated near, and away from, a jet nozzle. As can be understood from FIG. 6, the substrate is heated almost in accordance with the set temperature inside the chamber near the jet nozzle via which hot air is blown, but not in accordance with the set temperature inside the chamber away from the jet nozzle. So the substrate is heated in different manners near the jet nozzle and away from the jet nozzle, disrupting the uniform heating of the whole substrate.

Figure 7:
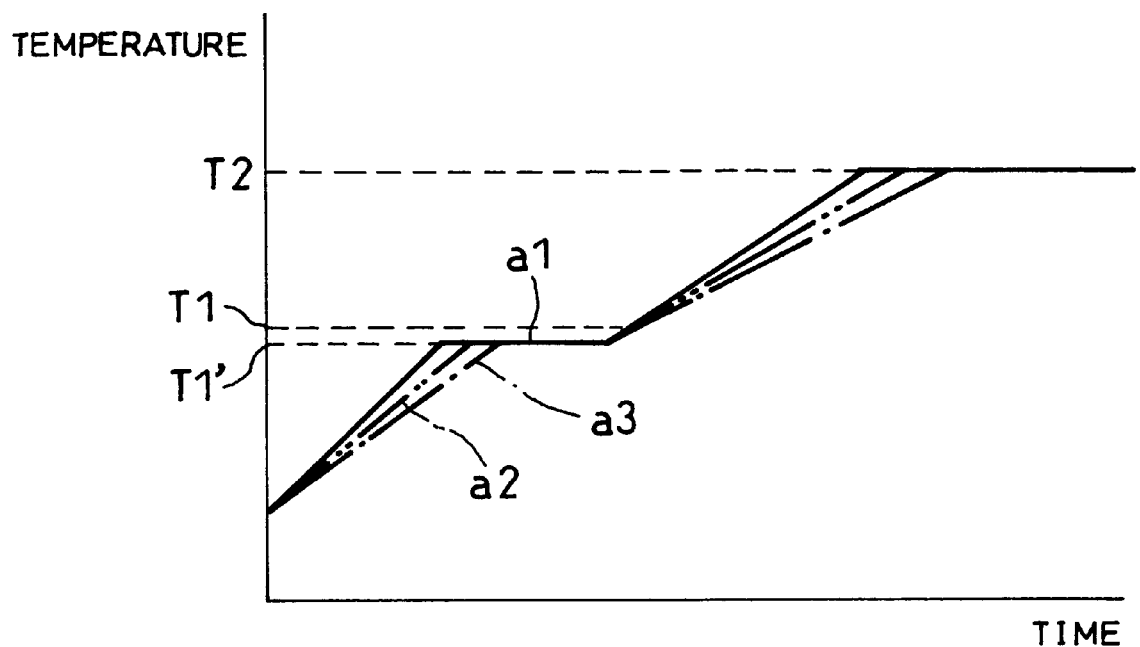
FIG. 7 is a graph showing temperature changes of a sealing material when heating is conducted in a gradual, stepped manner.

For heating conducted simultaneously with stepped evacuation, unlike embodiments 1 to 3, the present embodiment does not employ continuous heating, but stepped heating from room temperature to thermosetting temperature T2 of the sealing material 2 as denoted by a solid line in FIG. 7. Specifically, the electrode substrates 1 are temporarily maintained at predetermined temperature T1' that is lower than curing starting temperature T1 of the sealing material 2 during the heating.

The alternate long and two short dashes line in FIG. 7 denotes heating near the jet nozzle, and the alternate long and short dash line in FIG. 7 denotes heating away from the jet nozzle via which hot air is blown. The temperature becomes uniform throughout the entire substrate temporarily in the heating process by the gradual, stepped heating as shown in FIG. 7 (the substrate having a uniform predetermined temperature lower than curing starting temperature T1 temporarily). Therefore, the difference in temperature of the substrate 1 can be narrowed near the jet nozzle and away from the jet nozzle via which hot air is blown.

The following inconveniences entail if the electrode substrates 1 are not uniformly heated.

First, if an impure substance such as an organic solvent exists in the sealing material 2, the impure substance gasifies as a result of heating in the process of setting the sealing material 2 with heat. If the impure substance gasifies after the sealing material 2 starts curing, the impure substance is encased in the sealing material 2 and bubbles. In addition, if the gasified impure substance continues to expand and explodes in the sealing material 2, the sealing edges will be disturbed. The bubbling of gas and disturbance of the sealing edges are more likely where the electrode substrate 1 is quick to be heated, since the temperature thereof quickly reaches the curing starting temperature of the sealing material 2.

Secondly, possible emission of gas from the overcoating film 10 formed on the electrode substrate 1 and expansion of the air between the substrates during the heating of the electrode substrates 1 causes the pressure between the substrates to slightly exceed the set value. The pressure between the substrates nears the set value by continuous evacuation between the substrates. However, if heating of the electrode substrates 1 is non-uniform, since the entire sealing material 2 does not cure simultaneously, the cell gap increases at the part of the sealing material 2 that has cured before the pressure between the substrates reaches the set value, in comparison to the other part of the sealing material 2.

Those inconveniences become evident especially with a larger substrate.

By contrast, with the present embodiment, the difference are kept small throughout the whole electrode substrates 1 by maintaining for a period of time the electrode substrates 1 at predetermined temperature T1' lower than curing starting temperature Ti of the sealing material 2 before the sealing material 2 starts curing. Therefore, the sealing material 2 cures almost simultaneously throughout the whole electrode substrates 1, reducing non-uniformity in heating of the electrode substrates 1. This makes it possible for impure substances in the sealing material 2 to gasify almost simultaneously regardless of whether the part is likely to be heated or not, and be removed from the sealing material 2 before curing. Therefore the disturbance in the sealing edge can be restrained. Moreover, the uniform heating enables the gas emitted by the overcoating film 10 (see FIG. 4) formed on the electrode substrate 1 and the expanded air between the electrode substrates 1 to be evacuated almost at the same time before the sealing material 2 cures, making it possible to form a uniform cell gap between the electrode substrate 1.

Consequently, if a liquid crystal display element is made of the sealed electrode substrates 1, a liquid crystal material injected therebetween, and peripheral circuits and a backlight connected thereto, such a liquid crystal display element has features of excellent credibility and display quality. The above effects can be also surely obtained with liquid crystal display elements of larger sizes.

Predetermined temperature T1' is preferably as high as possible in the range below curing starting temperature T1 of the sealing material 2 in order to gasify the impure substances, such as an organic solvent, contained in the sealing material 2 and remove them from the sealing material 2 while the electrode substrates 1 are being maintained at predetermined temperature T1' for a period of time. The period of time for which the electrode substrates 1 are maintained at the temperature needs be long enough for the electrode substrates 1 to become uniform in temperature entirely and for the impure substances contained in the sealing material 2 to be removed completely.

The following description will explain example 8 concretely illustrating the heating and pressurization profile of the present embodiment. The sealing material 2 used here is the same as that in example 7.

Example 8

Figure 8:
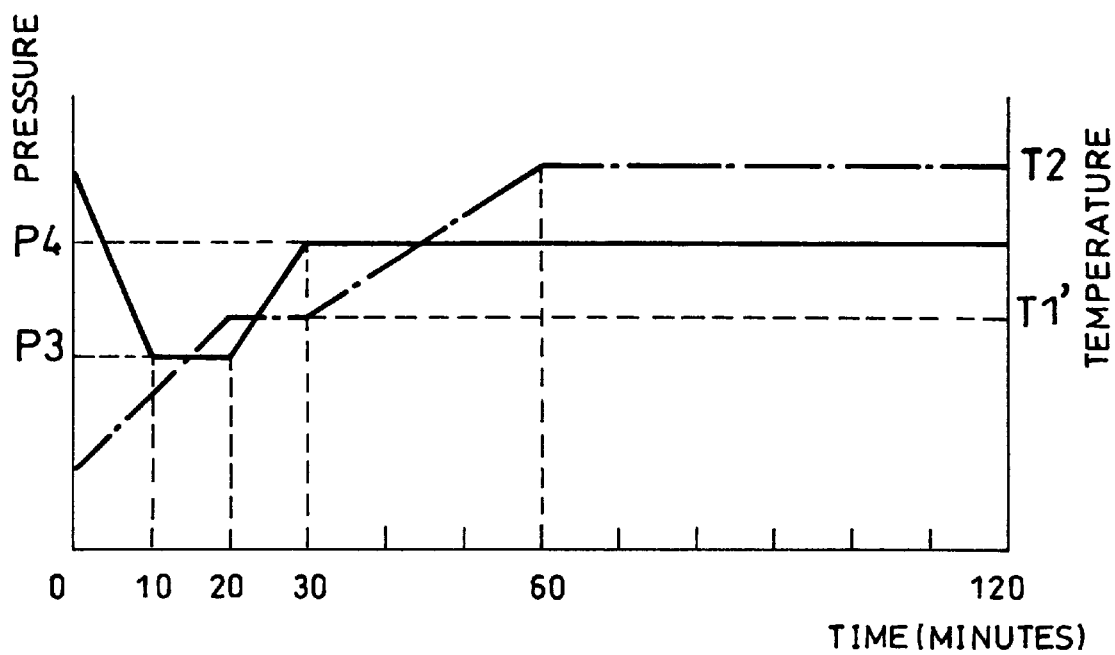
FIG. 8 is a graph illustrating another embodiment in accordance with the present invention in which the pressure between a pair of electrode substrates is controlled in a gradual, stepped manner while heating is being conducted in a gradual, stepped manner, and more particularly showing correlation between pressure changes in a space between a pair of electrode substrates and temperature changes of a sealing material.

FIG. 8 shows heating and pressurization profile in a sealing process for electrode substrates 1 of the present example, with the solid line denoting pressurization profile and the alternate long and short dash line denoting heating profile.

According to the heating profile shown in FIG. 8, the electrode substrates 1 are heated continuously from room temperature to 100° C. (predetermined temperature T1'), that is lower than curing starting temperature T1 of the sealing material 2. It is specified in the present example that predetermined temperature T1' is reached in 20 minutes, starting at room temperature.

Next, the electrode substrates 1 are maintained at predetermined temperature T1' for a period of time. It is specified in the present example that the electrode substrates 1 are maintained at predetermined temperature T1' for 10 minutes. The specification of the period of time is decided to allow the whole electrode substrates 1 to reach predetermined temperature T1' and the impure substances contained in the sealing material 2 to be removed completely.

Subsequently, the electrode substrates 1 and the sealing material 2 are heated continuously from predetermined temperature T1' to 150° C., i.e. the thermosetting temperature of the sealing material 2. It is specified in the present example that thermosetting temperature T2 is reached in 30 minutes, starting at thermosetting temperature T2. The electrode substrates 1 are thereafter maintained at thermosetting temperature T2 for a period of time to complete the heating profile. It is specified in the present example that the electrode substrates 1 are maintained at thermosetting temperature T2 for 60 minutes.

Meanwhile, according to the pressurization profile shown in FIG. 8, the following procedures are started in synchronization with the heating profile. First, the electrode substrates 1 are pressurized by continuously evacuating the space between the electrode substrates 1 so that the pressure therein changes from atmospheric pressure to 450 Torr, that is pressure P3. It is specified in the present example that pressure P3 is reached in 10 minutes, starting at atmospheric pressure.

Next, the electrode substrates 1 are maintained at pressure P3 for a predetermined period of time. It is specified in the present example that the electrode substrates 1 are maintained at pressure P3 for 10 minutes. The pressure between the pair of electrode substrates 1 is subsequently changed from pressure P3 to 600 Torr, that is pressure P4. It is specified in the present example that pressure P4 is reached in 10 minutes, starting at pressure P3. The electrode substrates 1 are then maintained at pressure P4 for a predetermined period of time to complete the pressurization profile. It is specified in the present example that the electrode substrates 1 are maintained at pressure P4 for 90 minutes to synchronize with the heating profile in the present example.

Thereafter, the combined electrode substrates 1 are subjected to after-bake treatment, liquid crystal material is injected between the electrode substrates 1, and peripheral circuits and a backlight are connected to complete the fabrication of a liquid crystal display element.

In the present example, since the heating is conducted in a gradual, stepped manner in synchronization with of the stepped evacuation as detailed above, the sealing material 2 cures almost simultaneously throughout the whole electrode substrates 1, reducing non-uniformity in heating of the electrode substrates 1. This makes it possible for impure substances in the sealing material 2 to gasify almost simultaneously and to be removed from the sealing material 2 before curing, regardless of which part of the electrode substrates 1 is heated more quickly than the rest. Therefore the disturbance in the sealing edges can be restrained. Moreover, the uniform heating enables the gas emitted by the overcoating film 10 (see FIG. 4) formed on the electrode substrate 1 and the expanded air between the substrates to be evacuated almost at the same time before the sealing material 2 cures, rendering the cell gap between the electrode substrates 1 uniform. It is thereby possible to obtain a liquid crystal display element of excellent credibility and display quality.

In the present example, unlike in embodiments 1 and 2, the stepped evacuation between the electrode substrates 1 is not conducted only for depressurization, but partly by such evacuation that increases the pressure after depressurization and maintenance at a predetermined pressure (evacuation being abated). Therefore, the effects detailed in example 7 can be produced as well as the effects produced by the stepped heating.

The stepped heating as detailed in the present example can be applied to embodiments 1 and 2 in which a gradual, stepped depressurization is conducted in the space between the electrode substrates 1.

Example 9

Figure 9:
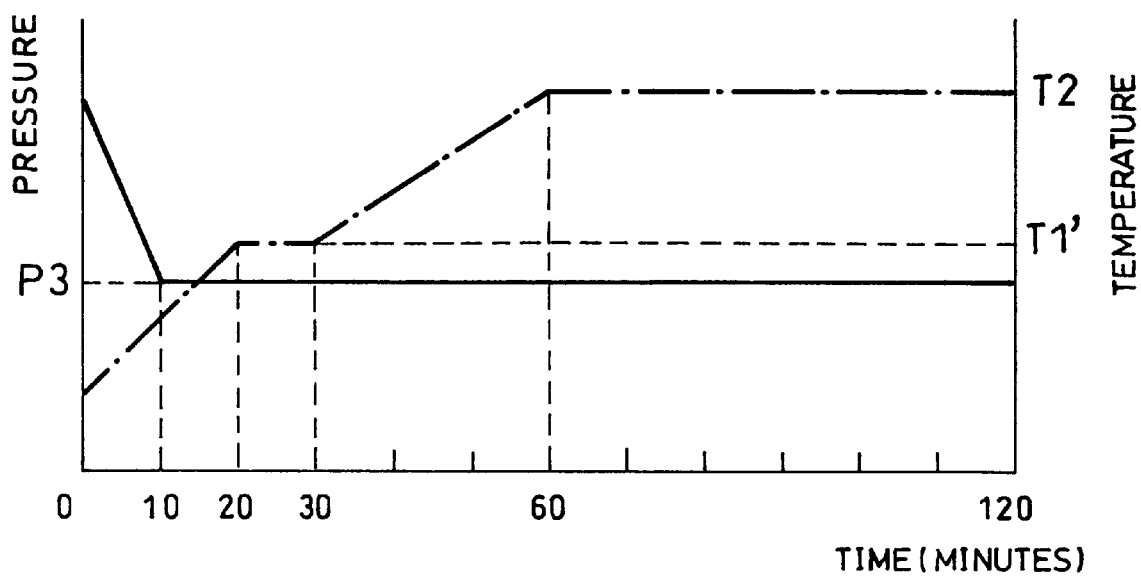
FIG. 9 is a graph illustrating another embodiment for the present invention in which the space between a pair of electrode substrates is evacuated without any break to a predetermined pressure while heating is being conducted in a gradual, stepped manner, and more particularly showing correlation between pressure changes in a space between a pair of electrode substrates and temperature changes of a sealing material.

FIG. 9 shows heating and pressurization profile in a sealing process for electrode substrates in the present example, with the solid line denoting pressurization profile and the alternate long and short dash line denoting heating profile. The sealing material 2 used in the present example is also the same as that in example 7.

According to the heating profile shown in FIG. 9, the electrode substrates 1 are heated continuously from room temperature to 100° C. (predetermined temperature T1'), that is lower than curing starting temperature T1 of the sealing material 2. It is specified in the present example that predetermined temperature T1' is reached in 20 minutes, starting at room temperature.

Next, the electrode substrates 1 are maintained at predetermined temperature T1' for a period of time. It is specified in the present example that the electrode substrates 1 are maintained at predetermined temperature T1' for 10 minutes. The specification of the period of time is decided to allow the whole electrode substrates 1 to reach predetermined temperature T1' and the impure substances contained in the sealing material 2 to be removed completely.

Subsequently, the electrode substrates 1 and the sealing material 2 are heated continuously to 150° C., that is thermosetting temperature T2 of the sealing material 2. It is specified in the present example that thermosetting temperature T2 is reached in 30 minutes, starting at predetermined temperature T1'.

The electrode substrates 1 are then maintained at thermosetting temperature T2 for a period of time to complete the heating profile. It is specified in the present example that the electrode substrates 1 are maintained at thermosetting temperature T2 for 60 minutes.

Meanwhile, according to the pressurization profile shown in FIG. 9, the following procedures are started in synchronization with the heating profile. First, the electrode substrates 1 are pressurized by continuously evacuating the space between the electrode substrates 1 so that the pressure therein changes from atmospheric pressure to 450 Torr, that is pressure P3. It is specified in the present example that pressure P3 is reached in 10 minutes, starting at atmospheric pressure.

Next, the space between the electrode substrates 1 is maintained at 450 Torr for a period of time to complete the pressurization profile. It is specified in the present example that the space is maintained at 450 Torr for 110 minutes to synchronize with the heating profile.

Thereafter, the combined electrode substrates 1 are subjected to after-bake treatment, liquid crystal material is injected between the electrode substrates 1, and peripheral circuits and a backlight are connected to complete the fabrication of a liquid crystal display element.

Heating is conducted gradually in a sealing process for electrode substrates 1 so that the pressure between the electrode substrates 1 reaches desired pressure P3 before the temperature thereof reaches predetermined temperature T1' as detailed above. Consequently, the whole electrode substrates 1 are uniformly heated, and the gas emitted with heating from the overcoating film 10 (see FIG. 4) and the expanded air between the substrates can be evacuated efficiently. no bubbles are observed to be formed by the sealing material 2, nor sealing edges being disturbed. A liquid crystal display element of excellent credibility and display quality is thus obtained with no non-uniformity in gap occurring near the sealing section and inside the surface.

Moreover, in the present example, after the pressure between the electrode substrates 1 are maintained at predetermined pressure P3 for a period of time, the space between the electrode substrates 1 is not evacuated to the final target value of pressure P4. However, the present example shares with example 1 to 6 the same arrangement that the pressure between the electrode substrates 1 is maintained at predetermined pressure P3 other than the final target value (pressure P4) in the evacuation process. By maintaining the pressure between the electrode substrates 1 at predetermined pressure P3 other than the final target value in the evacuation process, the difference in pressure is reduced between the portion composing the liquid crystal display element and the portion not composing the liquid crystal display element of the electrode substrates. Therefore, the arrangement of the present example surely produces the effects produced by examples 1 to 6.

In examples 8 and 9, predetermined temperature T1' is specified to 100° C., and the time to reach predetermined temperature T1' from room temperature is specified to 20 minutes. However, those figures are never meant to be restrictive and should be appropriately specified depending on the resin material contained in the sealing material 2, the sizes of the substrates, etc.

Also in examples 8 and 9, the electrode substrates 1 are maintained only once at a predetermined temperature for a predetermined period of time before the temperature of the sealing material 2 reaches thermosetting temperature T2 as a result of heating. However, the electrode substrates 1 may be maintained for a plurality of times at different predetermined temperatures, producing the same effects as those above.

As discussed so far, the method of manufacturing a liquid crystal display element in accordance with the present invention is constituted of a first process of combining the pair of electrode substrates 1 with the sealing material 2 and the spacers 3 therebetween; and a second process of controlling the cell gap by gradually evacuating the space 5 between the electrode substrates 1 for depressurization thereof and by pressing the electrode substrates 1 with atmospheric pressure.

According to this arrangement, since the space 5 between the electrode substrates 1 is evacuated gradually, the difference in pressure between the portion 7 composing the liquid crystal display element and the portion 8 not composing the liquid crystal display element between the electrode substrates 1 is surely made smaller than that in the conventional method. Therefore, the sealing material 2 does not bubble. Moreover, the air flows slower near the exhaust port 6 than in the conventional method of evacuating the space 5 at one time, thereby restraining the movement of the spacers 3 near the exhaust port 6.

Therefore, the arrangement prevents the sealing edge from becoming irregular due to the bubbling of the sealing material 2, thereby allowing the liquid crystal display element to have good linearity in the sealing edge. Moreover, since the movement of the spacers 3 is restrained near the exhaust port 6, the irregular display coloring is eliminated. Consequently, the liquid crystal display element thus obtained has good display characteristics.

In addition, in the second process of the method of manufacturing a liquid crystal display element in accordance with the present invention, (a) the evacuation is stopped temporarily when the pressure between the electrode substrates 1 reaches a predetermined pressure, and (b) the evacuation is continued again after the portion 7 composing the liquid crystal display element and the portion 8 not composing the liquid crystal display element between the electrode substrates 1 have almost the same pressure.

According to this arrangement, the evacuation is stopped temporarily when the pressure in the space 5 between the electrode substrates 1 reaches a predetermined pressure (e.g., 500 Torr). Then the evacuation is continued again after the portion 7 composing the liquid crystal display element and the portion 8 not composing the liquid crystal display element between the electrode substrates 1 have almost the same pressure. The arrangement almost eliminates the difference in pressure between the portion 7 composing the liquid crystal display element and the portion 8 not composing the liquid crystal display element between the electrode substrates 1. Moreover, the air flows slower near the exhaust port 6 than in the conventional method of evacuating the space 5 at one time, thereby restraining the movement of the spacers 3 near the exhaust port 6.

Therefore, the arrangement prevents the sealing edge from becoming irregular due to the bubbling of the sealing material 2, thereby allowing the liquid crystal display element to have good linearity in the sealing edge. Moreover, since the movement of the spacers 3 is restrained near the exhaust port 6, the irregular display coloring is eliminated. Consequently, the liquid crystal display element thus obtained has good display characteristics.

In the method of manufacturing a liquid crystal display element in accordance with the present invention, the sealing material 2 is a thermosetting type material, the sealing material 2 is heated at the same time with the evacuation, and the pressure between the electrode substrates 1 reaches a final target value before the sealing material 2 reaches the thermosetting temperature thereof.

Therefore, when the pressure between the electrode substrates 1 reaches the final target value (e.g., 200 Torr) while the evacuation for depressurization between the electrode substrates 1 and the heating are conducted at the same time, the sealing material 2 does not yet set and is still enough softened. Therefore, the pressing is properly conducted when the sealing material 2 is enough softened. Consequently, the liquid crystal display element thus obtained has excellent uniformity in the cell gap.

Moreover, the method of manufacturing a liquid crystal display element in accordance with the present invention includes the steps of:

(a) combining a pair of electrode substrates with a sealing material and spacers therebetween; and (b) controlling a cell gap by evacuating a space between the electrode substrates and pressing the electrode substrates with atmospheric pressure, and is characterized in that the heating includes processes of:

gasifying an impure substance contained in the sealing material before the sealing material starts curing;

maintaining the substrates at a predetermined temperature equal to or below the curing starting temperature of the sealing material to remove the gasified impure substance from the sealing material; and thereafter heating the substrates to the curing completion temperature of the sealing material.

With the arrangement, it becomes possible to restrain the difference in temperature throughout the whole electrode substrates by temporarily maintaining the substrates at a predetermined temperature equal to or below the curing starting temperature of the sealing material when the pair of substrates are heated from room temperature to the curing completion temperature of the sealing material.

The method of manufacturing a liquid crystal display element in accordance with the present invention is further characterized in that before the pair of electrode substrates is heated to the predetermined temperature, the pressure therebetween reaches a desired pressure.

With the arrangement, the gas emitted from the overcoating film with heating of the electrode substrates and the expanded air between the electrode substrates can be substantially removed prior to the curing of the sealing material, which restrains the difference in the cell gaps near the sealing material and in other parts of the substrates.

The method of manufacturing a liquid crystal display element in accordance with the present invention is further characterized in that before the pair of electrode substrates is heated to the curing completion temperature of the sealing material, the pressure therebetween reaches a pressure higher than the desired pressure.

With the arrangement, when the sealing material actually cures, the spacers contained in the sealing material can be prevented from sinking into the overcoating film by reducing the pressurization force exerted on the substrates prior to the curing of the sealing material.

The method of manufacturing a liquid crystal display element in accordance with the present invention is further characterized in that the pressure between the electrode substrates is specified in a range not less than 450 Torr and not more than 600 Torr.

With the arrangement, the spacers are prevented from being distorted by specifying the pressure between the electrode substrates to not less than 450 Torr, and the cell gap can be surely controlled by specifying the pressure to not more than 600 Torr.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A method of manufacturing a liquid crystal display element, comprising the steps of:

(1) sealing a pair of electrode substrates with a sealing material and spacers therebetween;

(2) controlling a cell gap by evacuating a space between the pair of electrode substrates and by pressing the pair of electrode substrates with atmospheric pressure; and (3) setting the sealing material, wherein the step (2) includes at least the step of maintaining the pressure in the space between the pair of electrode substrates at a predetermined pressure, and the steps (2) and (3) are conducted simultaneously.

2. The method of manufacturing a liquid crystal display element as defined in claim 1, wherein in the step (2) the space between the pair of electrode substrates is maintained at the predetermined pressure for a period of time by the evacuation thereof, and thereafter the space between the pair of electrode substrates is evacuated so that the pressure therein reaches a final target value.

3. The method of manufacturing a liquid crystal display element as defined in claim 2, wherein the period of time is not shorter than the time for the pressure in a portion composing the liquid crystal display element between the pair of electrode substrates to become almost equal to the pressure in a portion not composing the liquid crystal display element therebetween.

4. The method of manufacturing a liquid crystal display element as defined in claim 2, wherein the final target value is lower than the predetermined pressure.

5. The method of manufacturing a liquid crystal display element as defined in claim 4, wherein the sealing material is a thermosetting type material that sets with heat.

6. The method of manufacturing a liquid crystal display element as defined in claim 5, wherein the pressure in the space between the pair of electrode substrates reaches the final target value before the sealing material reaches a thermosetting temperature thereof.

7. The method of manufacturing a liquid crystal display element as defined in claim 4, wherein the space between the pair of electrode substrates is evacuated at an evacuation speed of 50 to 200 mm$^3$/minute.

8. The method of manufacturing a liquid crystal display element as defined in claim 4, wherein the space between the pair of electrode substrates is evacuated at an evacuation speed of 50 to 100 mm$^3$/minute.

9. The method of manufacturing a liquid crystal display element as defined in claim 1, wherein the spacers are mixed with the sealing material at a weight ratio to the sealing material of 4 to 10%.

10. The method of manufacturing a liquid crystal display element as defined in claim 1, wherein the spacers are mixed with the sealing material at a weight ratio to the sealing material of 8 to 10%.

11. The method of manufacturing a liquid crystal display element as defined in claim 2, wherein the final target value is higher than the predetermined pressure.

12. The method of manufacturing a liquid crystal display element as defined in claim 11, wherein the sealing material is a thermosetting type material that sets with heat.

13. The method of manufacturing a liquid crystal display element as defined in claim 12, wherein the pressure in the space between the pair of electrode substrates reaches the final target value before the sealing material reaches a thermosetting temperature thereof.

14. The method of manufacturing a liquid crystal display element as defined in claim 12, wherein in the step (3) the sealing material is set by continuous heating so that the temperature of the sealing material changes continuously.

15. The method of manufacturing a liquid crystal display element as defined in claim 12, wherein the step (3) includes the step of maintaining the pair of electrode substrates at a predetermined temperature for a period of time before the temperature of the sealing material reaches a thermosetting temperature.

16. The method of manufacturing a liquid crystal display element as defined in claim 15, wherein the predetermined temperature is not higher than a curing starting temperature of the sealing material.

17. The method of manufacturing a liquid crystal display element as defined in claim 11, wherein the pressure in the space between the electrode substrates is not lower than 450 Torr and not higher than 600 Torr.

* * * * *